G. B. STAPLES.
STAIR NOSING AND THE LIKE.
APPLICATION FILED NOV. 18, 1909.

966,133.

Patented Aug. 2, 1910.

Attest:
Ed. L. Tolson
Edward N. Saxton

Inventor:
George B. Staples,
By Greer, Middleton, Donaldson & Spear
Atty's.

UNITED STATES PATENT OFFICE.

GEORGE B. STAPLES, OF PHILADELPHIA, PENNSYLVANIA.

STAIR-NOSING AND THE LIKE.

966,133. Specification of Letters Patent. Patented Aug. 2, 1910.

Application filed November 18, 1909. Serial No. 528,788.

*To all whom it may concern:*

Be it known that I, GEORGE B. STAPLES, citizen of the United States, residing at Philadelphia, Pennsylvania, have invented certain new and useful Improvements in Stair-Nosing and the Like, of which the following is a specification.

It is the object of my invention to provide a nosing for stairs or steps mainly of rubber or like material, for use in connection with ordinary rubber tiling which is placed upon the tread of the stairway. I aim to provide a rubber nosing or protector which may be readily attached in place, and which will provide a cushion to protect the stair nosing and receive the wear.

The invention consists in the features and combination and arrangement of parts hereinafter described and particularly pointed out in the claims.

Figure 1:
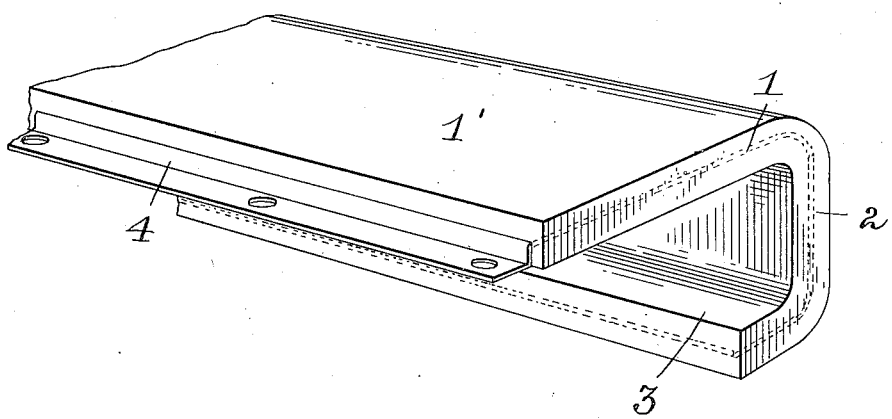
Figure 2:
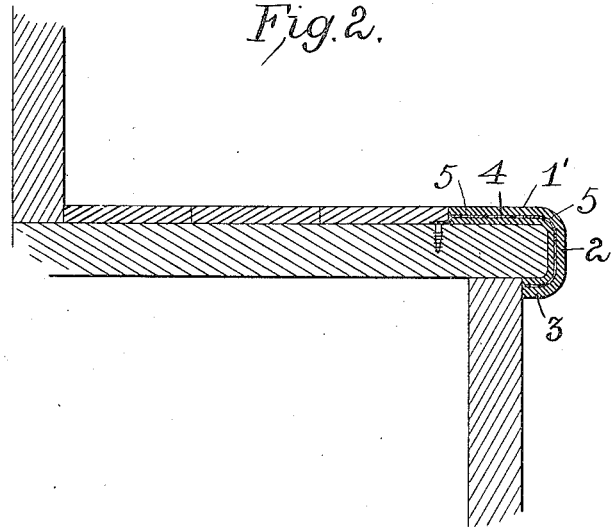

In the accompanying drawings: Figure 1 is a perspective view of a nosing built in accordance with my invention; and Fig. 2 is a sectional view of the nosing in place upon the step or stair.

In these drawings, 1 indicates the body of the nosing, which is composed of rubber or rubber composition having a flat tread portion 1', a downwardly extending portion 2, and a short flange 3 at its lower edge, the main portion 1' being considerably longer than this flange 3, and the whole of such a shape as to conform to the nosing of the step or stair. In order to provide an attaching device for this nosing, I employ a metal plate or clip 4 having a portion extending beyond the edge of the tread portion of the nosing, this extending portion or metal plate being perforated to receive screws or nails for attaching the nosing in place. This extension lies substantially in the same plane with the underside of the main portion 1' of the nosing, and at the inner part of this metal extension the plate bends upwardly to about the middle of the edge of the rubber, and thence extends throughout the body of the nosing down the front portion, and thence to the edge of the lower flange 3, lying substantially midway of the thickness of the rubber material. By this construction I secure a cushioning effect on each side of the metal plate, there being a layer or portion of the rubber on the outer or upper side of the metal plate where it receives the wear, and there being also a portion or layer of rubber material between the metal plate and the nosing or tread of the step. This prevents the metal plate from coming in direct contact with the step or nosing thereof, and provides a cushion between the metal and the step which will prevent noise or rattling of the nosing when in use, and will provide for a close cushion connection between the nosing and the step or stair. The position described of the metal attaching flange will enable the tiles which are placed on the tread of the step to be fitted closely against the edge of the rubber nosing in order to make a close, neat joint. The metal plate will, of course, act to strengthen the rubber material throughout its extent.

I do not limit myself to the bent form of metal plate in order to bring its extending portion in position for attachment to the step, as the metal plate may be differently arranged so that its extension will emerge from the rubber substantially in the same plane with the lower face of the tiling, and yet the main portion of the plate will be embedded therein.

The plate is provided with openings at 5 to receive the rubber of the nosing, so that the portions of the rubber on both sides of the plate will be integrally united. If desired, the metal plate may also extend from the edge of the flange 3, where it is bent down along the face of the riser, and being attached thereto, will hold this edge of the nosing in place.

I claim as my invention:—

1. A nosing of rubber or like material for steps having a metal clip embedded therein, with an extension at one edge for attachment to the step, said extension being substantially in the same plane with the under surface of the tread portion of the nosing, substantially as described.

2. A nosing of rubber or like material for steps, having embedded therein a clip or plate which is covered on both sides with the material of the rubber nosing, and having a flange or extension beyond the edge of the nosing for attachment to the step, said extension being in the same plane with the under surface of the tread portion of the nosing, substantially as described.

3. A rubber nosing for steps having a metal plate or clip embedded therein, with an extension to receive the fastening device offset from the main body of the plate, substantially as described.

4. A nosing of rubber with a perforated plate embedded therein through which the upper and lower portions of the rubber are integrally united, and said plate having an extension for attachment to the step, said
5 extension being in the same plane as the under surface of the tread portion of the nosing, substantially as described.

In testimony whereof, I affix my signature in presence of two witnesses.

GEORGE B. STAPLES.

Witnesses:
WALTER DONALDSON,
HENRY E. COOPER.